Patented Mar. 31, 1942

2,278,223

UNITED STATES PATENT OFFICE 2,278,223

MANUFACTURE OF CATALYSTS

John F. Sturgeon, Chicago, Ill., assignor to Universal Oil Products Company, Chicago, Ill., a corporation of Delaware No Drawing. Application September 8, 1939, Serial No. 293,923

10 Claims. (Cl. 252—254)

This invention relates to the manufacture of catalysts suitable for accelerating hydrocarbon conversion reactions, and more specifically to a process for manufacturing granular refractory catalytic materials which are particularly effective in selectively promoting the dehydrogenation of the low boiling members of the paraffin series of hydrocarbons into their corresponding olefins.

There is a large commercial production of gaseous paraffin hydrocarbons. They occur in very large quantities in natural gas, particularly those gases associated with the production of crude oil and commonly known as casing-head gases, and this supply is further augmented by the gases produced in cracking oils for the production of gasoline, although this latter type of pyrolytically produced gas contains substantial quantities of olefins as well as of paraffins.

The greater part of the paraffin gas produced is used merely for domestic and industrial fuel purposes and not as a source of hydrocarbon derivatives, on account of the low reactivity of its components in comparison with the greater reactivity of their olefinic counterparts.

In one specific embodiment the present invention comprises a process for the manufacture of catalysts suitable for use in hydrocarbon dehydrogenation reactions using a series of interrelated preparative steps comprising forming a precipitated alumina hydrogel, compositing therewith a relatively minor proportion of chromia and magnesia hydrogels, filtering from mechanically removable water, freezing and then thawing the hydrogel composite to destroy its gelatinous structure, filtering and washing to remove water soluble impurities, drying, forming into particles, and calcining to produce an active catalyst.

The invention comprises the formation of a hydrogel of the material used in the manufacture of the catalyst by any known means, such as the precipitation of an alumina hydrogel from a solution of an aluminum salt by means of the introduction of a basic material, such as ammonium hydroxide, ammonium carbonate, ammonium sulfide, or their equivalents. Similarly, an alumina hydrogel may be formed by mixing a solution of an aluminum salt with an aqueous solution of sodium aluminate. Alumina hydrogel prepared by this or any other method may be composited with hydrogels of chromia and magnesia, the resulting composite separated by decantation or filtration from the readily removable water, and the hydrogel then frozen. The exact conditions for the freezing operation, such as temperature, rate, and time of freezing are dependent upon the gel composition in question, its water content, and other factors. During freezing the hydrogel composite loses its gel structure so that the thawing of the frozen material produces an aqueous solution and fine powder or granular material which may be separated from the aqueous solution. The solid powdered material obtained from the thawing of the hydrogel may then be washed with water to remove water soluble impurities. If desired, the powdered material may be ground further and formed into particles by extrusion, pelleting, or other similar methods with or without the addition of promoters prior to the particle forming operation. The pelleted or otherwise formed catalyst particles are then calcined at a temperature in the approximate range of 900–1500° F. to produce active catalytic material.

The process of freezing precipitated hydrogel composites is applicable particularly to the preparation of alumina-chromia-magnesia dehydrogenation catalysts as described, and may be used also in the preparation of any other catalyst which may be produced in the form of a precipitated hydrogel or hydrogel composite which requires washing to free it from water soluble impurities. Thus the process of this invention may be applied to any type of catalytic material which exists as a hydrogel during one phase of its manufacture and requires repeated washes with water and aqueous solutions to remove deleterious impurities.

The advantages of utilizing freezing of hydrogel composites during the preparation of catalysts therefrom are that the frozen and thawed catalytic composites may be washed free of alkali metal compounds more easily than is possible when operating with the original hydrogels. Frequently grinding of the composite is unnecessary before forming into catalyst particles and several other drying, grinding, and screening operations are avoided which must ordinarily be made when removal of impurities from precipitated hydrogel catalysts is effected mainly by washing. Accordingly when grinding of the catalyst is unnecessary there is less danger of contaminating it with ferrous metals and thus impairing its activity. Also, the apparent density of the catalyst prepared from a frozen hydrogel composite is less than that of similar catalysts prepared from the same kind of hydrogels which have been merely washed to remove water soluble impurities.

It is best practice in the final steps of preparation of aluminum oxides for use in dehydrogenation catalyst composites to calcine them for some time, before or after the addition of a chromium compound, at a temperature within the approximate range of 900–1500° F. Such calcination treatment does not cause complete dehydration of the hydrated oxides but gives catalytic material of good strength and porosity so that they are able to resist for a long time the deteriorating effects of the service and reactivation periods to which they are subjected.

The element chromium has several oxides, the four best known being CrO, $Cr_2O_3$, $Cr_3O_4$, and $CrO_3$. The sesquioxide $Cr_2O_3$ is readily produced by heating salts of chromium or the trioxide in hydrogen or hydrocarbon vapors at temperatures above 300° C. The dioxide (chromic chromate) has been considered to be an equimolecular mixture of the trioxide and the sesquioxide. The oxides are readily developed on the surfaces and in the pores of alumina granules by utilizing primary solutions of chromic acid, $H_2CrO_4$, or chromic nitrate, $Cr(NO_3)_3$. The calcination of the chromic acid, the nitrate, or a precipitated trihydroxide produces primarily the trioxide which is then reduced to the sesquioxide to furnish an active catalyst for use in reactions of the present character.

Experiments have shown that the addition of relatively small proportions of magnesia or of other magnesium compounds, such as the chromate or hydroxide, leads to the production of improved dehydrogenation catalyst with longer life and less fouling by carbon deposition than occurs in the presence of similar alumina-chromia mixtures containing no magnesium compounds. The addition of magnesia to such alumina-chromia composites apparently results in the formation of a dehydrogenation catalyst with a spinel type of structure and a long active life. Such an increase in the dehydrogenating life of this type of catalyst is possibly due to the magnesia exerting an inhibiting effect upon the crystallization of the active components of the catalyst at the relatively high temperatures to which it is subjected during periods of use and reactivation.

In the present instance the catalysts which are preferred for selectively dehydrogenating the lower boiling paraffinic hydrocarbons have been evolved as the result of a large amount of investigation with catalysts having a dehydrogenating action upon various types of hydrocarbons, such as are encountered in the fractions produced by the distillation and/or pyrolysis of petroleum and other hydrocarbon oil mixture. The criterion of an acceptable dehydrogenating catalyst is that it shall split off hydrogen without inducing either scission of the bonds between carbon atoms or carbon separation. In the present invention catalyst composites are used comprising varying proportions of aluminum oxide, chromium sesquioxide, and magnesium oxide, herein referred to as alumina, chromia, and magnesia, respectively. These components of the preferred composites have some catalytic activity in themselves but the activity and practical value of each in the dehydrogenation reactions which characterize the invention is definitely and materially improved by the presence of the others in more or less intimate contact or admixture.

The value of different composites and the activity of composites having different proportions of the ingredients have been found to vary considerably with the methods of preparation of the composites. In some instances the most effective and economical proportions comprise major amounts of alumina and relatively minor amounts of chromia and magnesia; while in other cases best results are obtained when employing major amounts of chromia and minor amounts of alumina and magnesia.

In preparing dehydrogenation catalysts of the types indicated, alumina and chromia may be composited and mixed with relatively minor amounts of magnesia in several ways to form composites which may be calcined at a temperature in the approximate range of 900–1500° F. to produce active dehydrogenating catalysts.

According to one method of preparation a precipitated alumina hydrogel is prepared by addition of a base to an aluminum salt, as the chloride, nitrate, or sulfate, or precipitated alumina hydrogel may be formed by the addition of an acid such as hydrochloric or sulfuric, or of a solution of an aluminum salt to a sodium aluminate solution. Alumina hydrogel so formed is frozen and then thawed so as to break down the gel structure producing hydrated aluminum oxide in powdered form, which is separated from mechanically removable water, washed to remove water soluble impurities, and dried. The dried powder may then be impregnated with chromic acid dissolved in water, and the desired quantity of magnesium oxide may then be added to the impregnated powder. The resultant composite of hydrated oxides of aluminum, chromium, and magnesium is then dried, formed into particles, and calcined.

According to a second method hydrated aluminum oxide is prepared by precipitation, and the hydrogel is frozen, washed, and dried as in the first method. Then the hydrated aluminum oxide is calcined at a temperature in the range of 900–1500° F. to produce activated alumina which is impregnated with chromic acid solution and the desired amount of magnesium hydroxide is added.

By a third method of preparation aluminum and chromium salts, such as the nitrates, are dissolved in water and a mixture of alumina and chromia hydrogels are precipitated therefrom by addition of a base, such as ammonium hydroxide, ammonium carbonate, or any other suitable precipitant. The resultant hydrogel composite is frozen, thawed, filtered, washed, and dried, and the desired proportion of magnesium hydroxide may then be added to the dried alumina-chromia composite which is next formed into particles and calcined to produce an active dehydrogenation catalyst. Instead of adding magnesium hydroxide to the alumina-chromia composite it is also possible to effect the same improvement in the final catalyst by similarly adding magnesium chromate. Also alumina, chromia, and magnesia hydrogels formed separately by precipitation may be admixed to produce the desired composite catalyst.

Variable factors will be introduced in the preparation of the preferred catalyst when different methods of mechanical mixing, wet precipitation, co-precipitation and calcining are used and variable results will be obtained also, depending upon the character of the particles employed in the dehydrogenation operations; that is, whether they are used as powder, granules, or in the form of pellets or extruded particles.

In practicing the dehydrogenation of paraffinic gases, and particularly of butanes, according to the present process, a solid composite catalyst prepared according to some one of the foregoing briefly outlined methods is used as a filler in reaction tubes or chambers in the form of particles of graded size or small pellets, and the gas to be dehydrogenated is passed through the catalyst after being heated to the proper temperature, usually within the range of approximately 750–1400° F. The temperatures most commonly used, however, are in the order of 900–1150° F.

The catalyst tubes or chambers may also be heated exteriorly to maintain the proper temperature for the reaction. The pressures employed may be sub-atmospheric, atmospheric, or slightly super-atmospheric of the order of 50–100 pounds per square inch. While pressures up to approximately 500 pounds per square inch may be employed in some cases, pressures of the order of atmospheric or below are frequently preferred. The time during which the gases are exposed to dehydrogenating conditions in the presence of the preferred catalyst is comparatively short, usually below 20 seconds and preferably as low as from 0.1 to 6 seconds. The time of catalytic contact employed will vary with the activity of the catalyst used as well as with the temperature employed on the individual paraffins or mixtures thereof.

Since the usual method of operating commercial plants is to utilize units connected in parallel so that one may be dehydrogenating a hydrocarbon charge while the other is being reactivated by heating in an oxygen-containing gas, it is preferable to so balance conditions in the two parts of the cycle that the times of processing and reactivation are substantially equal. A further problem to be solved by trial is the question of the length of the operating cycle, since best overall results are obtained in continuous plants when operations are conducted for relatively short intervals followed by a correspondingly short time of reactivation rather than by allowing the catalyst particles to become contaminated excessively by carbonaceous deposits.

The exit gases from the catalytic dehydrogenation reactors may be passed through selective absorbents to combine with or absorb the olefin or olefin mixture produced, or the olefins may be selectively polymerized by suitable catalysts, caused to alkylate other hydrocarbons such as aromatics or paraffins, or treated directly with chemical reagents to produce other desirable and commercially valuable derivatives. After the olefins have been removed the residual gases may be recycled for further treatment with or without complete removal of hydrogen.

The present types of catalysts are selective in removing two hydrogen atoms from a paraffin molecule to produce the corresponding olefin without furthering to any great extent undesirable side reactions, and because of this show an unusually high conversion of paraffins into olefins, as will be shown in later examples. When the activity of such a catalyst begins to diminish it is readily reactivated by the simple expedient of oxidizing with air or other oxidizing gas at a moderately elevated temperature, usually within the range employed in the dehydrogenating reactions. This oxidation effectively removes most of the carbon deposits which contaminate the surface of the particle and decrease their efficiency. It is characteristic of the present types of catalysts that they may be reactivated repeatedly without substantial loss of catalytic efficiency.

During oxidation with air or with another oxidizing gas mixture in reactivating partly spent material, there is evidence to indicate that the oxide $Cr_2O_3$ is to a large extent, if not completely, oxidized to $CrO_3$ which combines to a greater or lesser extent with the alumina to form an aluminum chromate. Later this chromate, or the adsorption complex of $CrO_3$ on $Al_2O_3$ is decomposed by contact with reducing gases in the first stages of service to reform the green sesquioxide, $Cr_2O_3$, and regenerate the real catalyst and hence the catalytic activity.

It has been found essential that particular conditions of operation be observed in order to produce maximum yields of butenes from butanes by aluminum oxide-chromium sesquioxide catalysts of suitable activity. In regard to temperature, the optimum range is from approximately 1100 to 1200° F., at the surface of the catalytic particles. It is essential that in combination with a suitable hourly space velocity, this temperature be maintained within this relatively narrow range and that it be measured in the catalyst mass at a sufficient number of points so that the average temperature falls within this interval. It is customary in many commercial plants to measure inlet and outlet temperatures of catalyst chambers and consider the average temperature to be the mean of these two. But this is not accurate practice since dehydrogenation reactions are endothermic and the average temperature would not be represented by the mean of the inlet and outlet on account of the need for adding heat externally.

In using the above conditions of temperature, pressure, and time, a conversion per pass of butanes to butenes of about 15 to 25% is preferably effected, which, it has been found, corresponds to a minimum deposition of carbon upon the surface of the catalyst and a minimum of side reactions, such as would result in the formation of degradation products resulting from the scission of the carbon-to-carbon bonds. If a time of contact is maintained corresponding to a maximum once-through yield of butenes (which may be as high as 50–60%) the deposition of carbon is greatly accelerated and demethanization and other splitting reactions rather than dehydrogenation occur, whereas when approximately a 25% conversion per pass is maintained it is possible to produce ultimate yields of approximately 95% of butenes by recycling of unconverted butane. Further, it has been determined that in dehydrogenation of butanes by the preferred catalysts, the rate of carbon deposition passes through a minimum within the temperature range given. That is, if temperatures lower than 1100° F. are employed and the time of contact is increased to obtain approximately 25% conversion per pass, a relatively large amount of carbon is deposited and similarly the rate of carbon deposition begins to rise markedly at temperatures above 1290° F. even though the time of contact is reduced to maintain only a 25% conversion per pass.

The following example is submitted to show specific instances of the preparation of the present type of catalysts and the results obtained when using these catalysts in dehydrogenating butane, although the data submitted are not intended to limit correspondingly the generally broad scope of the invention:

Four comparative dehydrogenation catalysts were prepared so as to have compositions corresponding to the molecular ratios of

$30\ Al_2O_3 : 3\ Cr_2O_3 : 2\ MgO$

One of these composites was prepared by precipitating aluminum hydroxide from aluminum sulfate solution by the addition of aqueous ammonia, repeated washing to remove water soluble impurities, and drying to produce aluminum hydroxide powder which was impregnated with aqueous chromic acid solution to which precipitated magnesium hydroxide had been added previously. The other three composites were prepared by the three methods described in this specification which involve slow freezing of a precipitated aluminum hydroxide hydrogel to break up its gelatinous structure and form powdered aluminum hydroxide which may be washed more easily than the gelatinous material to remove water soluble impurities.

Each of these four catalyst composites was dried, formed into 3 x 3 mm. particles by a pelleting machine, and then calcined in air for 10 hours at 1472° F. after which they were utilized in dehydrogenating normal butane at 1112° F. under atmospheric pressure using a gaseous space velocity of 1500 and a dehydrogenating period of 45 minutes in length. The results obtained per pass in the presence of these catalytic materials are given in Table 1:

TABLE 1

Dehydrogenation of normal butane in the presence of 30 $Al_2O_3$:3 $Cr_2O_3$:2 $MgO$ catalysts

| Method of preparation | Precipitation, washing, compositing, and calcining | Precipitation, freezing, washing, compositing, and calcining | Precipitation, freezing, washing, activating, compositing, and calcining | Co-precipitation, freezing, and calcining |
|---|---|---|---|---|
| Catalyst: | | | | |
| Parts by volume | 11.3 | 11.3 | 11.3 | 11.3 |
| Parts by weight | 11.2 | 8.5 | 9.1 | 10.9 |
| Olefins produced, volume percent: | | | | |
| Total | 24.2 | 22.8 | 21.8 | 19.0 |
| Ethylene | 0.4 | 0.4 | 0.9 | 1.5 |
| Propene and n-butenes | 23.3 | 21.9 | 20.7 | 17.5 |

From the results given in Table 1 it is evident that dehydrogenation catalysts prepared from precipitated hydrogels which have been frozen to break down the gelatinous gel structure compare favorably in dehydrogenating activity with dehydrogenation catalysts of similar composition prepared by the longer method necessary when freezing is not utilized as a step in catalyst preparation.

The character of the present invention and its novelty and utility can be seen from the preceding specification and numerical data presented, although neither section is intended to unduly limit its generally broad scope.

I claim as my invention:

1. A process for preparing a granular catalytic material useful in hydrocarbon conversion reactions which comprises forming a composite of precipitated alumina and chromia hydrogels, sufficiently freezing and then thawing said composite to destroy its gelatinous structure and to convert it into a substantially amorphous and non-gelatinous composite powder and an aqueous solution, filtering to separate a major proportion of said aqueous solution from said powder, washing the powder to remove water soluble impurities, forming said powder into particles, drying, and calcining said particles.

2. In a process for preparing an alumina containing composite material useful in the catalytic dehydrogenation of paraffins to olefins, the steps which comprise precipitating alumina hydrogel by addition of a base to an aqueous solution of an aluminum salt selected from the group consisting of the chloride, nitrate, and sulfate; sufficiently freezing and then thawing said hydrogel to destroy its gelatinous structure and to convert it into a substantially amorphous and non-gelatinous composite powder and an aqueous solution; filtering to separate a major proportion of said aqueous solution from said powder; washing the powder to remove water soluble impurities; drying; forming the powder into particles; and calcining said particles at a temperature in the approximate range of 900–1500° F.

3. A process for preparing an alumina containing composite material useful in the catalytic dehydrogenation of paraffins to olefins which comprises precipitating alumina hydrogel by addition of a basic reagent selected from the group consisting of ammonium hydroxide, ammonium carbonate, and ammonium sulfide to an aqueous solution of an aluminum salt; sufficiently freezing and then thawing said hydrogel to destroy its gelatinous structure and to convert it into a substantially amorphous and non-gelatinous composite powder and an aqueous solution; filtering to separate a major proportion of said aqueous solution from said powder; washing the powder to remove water soluble impurities; drying and impregnating said powder with chromic acid; heating to remove water; forming the impregnated powder into particles; calcining said particles at a temperature in the approximate range of 900–1500° F.; and reducing a substantial proportion of the chromium trioxide in said particles to chromium sesquioxide by a reducing gas selected from the group consisting of hydrogen and hydrocarbons.

4. A process for preparing a catalytic material useful in the dehydrogenation of paraffins to olefins which comprises precipitating alumina hydrogel by addition of a basic reagent selected from the group consisting of ammonium hydroxide, ammonium carbonate, and ammonium sulfide to an aqueous solution of an aluminum salt; sufficiently freezing and then thawing said hydrogel to destroy its gelatinous structure and to convert it into a substantially amorphous and non-gelatinous composite powder and an aqueous solution; filtering to separate a major proportion of said aqueous solution from said powder; washing the powder to remove water soluble impurities; drying and impregnating said powder with chromic acid; heating to remove water; compositing with the impregnated powder a relatively minor proportion of a magnesium compound selected from the group consisting of the hydroxide, oxide, and chromate; forming the composited powder into particles; calcining said particles at a temperature in the approximate range of 900–1500° F.; and reducing a substantial proportion of the chromium trioxide in said particles to chromium sesquioxide by a reducing gas selected from the group consisting of hydrogen and hydrocarbons.

5. A process for preparing a catalytic material useful in the dehydrogenation of paraffins to olefins which comprises precipitating alumina hydrogel by addition of an acid to sodium aluminate solution; sufficiently freezing and then thawing said hydrogel to destroy its gelatinous structure and to convert it into a substantially amorphous and non-gelatinous composite powder and an aqueous solution; filtering to separate a major proportion of said aqueous solution from said powder; washing the powder to remove water soluble impurities; drying and impregnating said powder with chromic acid; heating to remove water; forming the impregnated powder into particles; calcining said particles at a temperature in the approximate range of 900–1500° F.; and reducing a substantial proportion of the chromium trioxide in said particles to chromium sesquioxide by a reducing gas selected from the group consisting of hydrogen and hydrocarbons.

6. A process for preparing a catalytic material useful in the dehydrogenation of paraffins to olefins which comprises precipitating alumina hydrogel by addition of a base selected from the group consisting of ammonium hydroxide, ammonium carbonate, and ammonium sulfide to an aqueous solution of an aluminum salt selected from the group consisting of the chloride, sulfate, and nitrate; sufficiently freezing and then thawing said hydrogel to destroy its gelatinous structure and to convert it into a substantially amorphous and non-gelatinous composite powder and an aqueous solution; filtering to separate a major proportion of said aqueous solution from said powder; washing the powder to remove water soluble impurities; drying and impregnating said powder with chromic acid; heating to remove water; compositing with the impregnated powder a relatively minor proportion of a magnesium compound selected from the group consisting of the hydroxide, oxide, and chromate; forming the composited powder into particles; calcining said particles at a temperature in the approximate range of 900–1500° F., and reducing a substantial proportion of the chromium trioxide in said particles to chromium sesquioxide by a reducing gas selected from the group consisting of hydrogen and hydrocarbons.

7. A process for preparing a catalytic material useful in the dehydrogenation of paraffins to olefins which comprises co-precipitating alumina and chromia hydrogels by addition of a base to an aqueous solution containing aluminum and chromium salts forming a hydrogel composite of precipitated alumina and chromia, sufficiently freezing and then thawing said hydrogel composite to destroy its gelatinous structure and to convert it into a substantially amorphous and non-gelatinous composite powder and an aqueous solution, filtering to separate a major proportion of said aqueous solution from said powder, washing the powder to remove water soluble impurities, forming said powder into particles, drying and calcining said particles at a temperature in the approximate range of 900–1500° F.

8. A process for preparing a catalytic material useful in the dehydrogenation of paraffins to olefins which comprises co-precipitating alumina and chromia hydrogels by addition of a base to an aqueous solution containing aluminum and chromium salts forming a hydrogel composite; sufficiently freezing and then thawing said hydrogel composite to destroy its gelatinous structure and to convert it into a powder and an aqueous solution; filtering to separate a major proportion of said aqueous solution from said powder; washing the powder to remove water soluble impurities; drying and impregnating said powder with chromic acid; heating to remove water; compositing with the impregnated powder a relatively minor proportion of a magnesium compound selected from the group consisting of the hydroxide, oxide, and chromate; forming the composited powder into particles; calcining said particles at a temperature in the approximate range of 900–1500° F.; and reducing a substantial proportion of the chromium trioxide in said particles to chromium sesquioxide by a reducing gas selected from the group consisting of hydrogen and hydrocarbons.

9. A process for preparing a catalytic material useful in the dehydrogenation of butanes to butenes which comprises co-precipitating alumina and chromia hydrogels by addition of a base to an aqueous solution containing aluminum and chromium salts forming a hydrogel composite; sufficiently freezing and then thawing said hydrogel composite to destroy its gelatinous structure and to convert it into a powder and an aqueous solution; filtering to separate a major proportion of said aqueous solution from said powder; washing the powder to remove water soluble impurities; drying and compositing with the dried powder a relatively minor proportion of a magnesium compound selected from the group consisting of the hydroxide, oxide, and chromate; forming the composited powder into particles; calcining said particles at a temperature in the approximate range of 900–1500° F.; and reducing a substantial proportion of the chromium trioxide in said particles to chromium sesquioxide by a reducing gas selected from the group consisting of hydrogen and hydrocarbons.

10. A process for preparing a catalytic material useful in hydrocarbon conversion reactions which comprises forming a composite of precipitated alumina and chromia hydrogels, sufficiently freezing and then thawing said composite to destroy its gelatinous structure and to convert it into a substantially amorphous and non-gelatinous composite powder and an aqueous solution, filtering to separate a major proportion of said aqueous solution from said powder, washing the powder to remove water soluble impurities, drying the washed material and calcining it at a temperature in the approximate range of 900–1500° F.

JOHN F. STURGEON.